United States Patent [19]

Schoustra et al.

[11] Patent Number: 4,971,844
[45] Date of Patent: Nov. 20, 1990

[54] MEANS FOR FIXING OR TRANSFERRING AND FIXING POWDER CONTAINING THERMOPLASTIC RESIN ON A RECEIVING MATERIAL

[75] Inventors: Bauke Schoustra, Velden; Johannes H. A. Kuiper, Grubbenvorst, both of Netherlands

[73] Assignee: Oce-Nederland B.V., Venlo, Netherlands

[21] Appl. No.: 372,282

[22] Filed: Jun. 27, 1989

[30] Foreign Application Priority Data

Jul. 1, 1988 [NL] Netherlands ......................... 8801669

[51] Int. Cl.$^5$ ............................................... B32B 3/00
[52] U.S. Cl. ................................... 428/34.1; 428/34.7; 428/195; 428/446; 428/913; 430/39; 430/98; 118/100
[58] Field of Search ............... 428/34.1, 34.7, 195, 428/446, 913; 430/39, 98; 118/100

[56] References Cited

U.S. PATENT DOCUMENTS

| | | | |
|---|---|---|---|
| 3,554,836 | 1/1971 | Steindorf | 428/914 |
| 3,893,761 | 7/1975 | Buchan et al. | 430/126 |
| 4,257,699 | 3/1981 | Lentz | 430/99 |
| 4,264,181 | 4/1981 | Lentz et al. | 430/99 |
| 4,272,179 | 6/1981 | Seanor | 430/99 |

FOREIGN PATENT DOCUMENTS 0146980 7/1985 European Pat. Off. .
1279687 6/1972 United Kingdom .

*Primary Examiner*—Patrick Ryan
*Attorney, Agent, or Firm*—Reed Smith Shaw and McClay

[57] ABSTRACT

A device for fixing or transferring and fixing a powder containing thermoplastic resin on to a receiving material under the influence of pressure and heat, in which device the fixing member in pressure contact with the powder during the fixing of the powder image is provided with an outer covering consisting mainly of silicone rubber. The silicone rubber is the reaction product of polyorganosiloxane bearing Si—H groups and polyorganosiloxane which bears Si—(CH=CH$_2$) groups and which on average contains between 40 and 1000 monomeric units per polymer chain, bears 1.5–4 terminal vinyl groups, bears at most one non-terminal vinyl group per 80 monomeric units and contains at most 2% Si atoms in the form of SiO$_{3/2}$ or SiO$_{4/2}$ units. The thickness of the silicone rubber covering is preferably less than 500 micrometers.

11 Claims, No Drawings

MEANS FOR FIXING OR TRANSFERRING AND FIXING POWDER CONTAINING THERMOPLASTIC RESIN ON A RECEIVING MATERIAL

FIELD OF THE INVENTION

The invention relates to a device for fixing or transferring and fixing a powder containing a thermoplastic resin on to a receiving material under the influence of pressure and heat, and, in particular, a fixing member having an outer covering of silicone rubber.

BACKGROUND OF THE INVENTION

In many modern reproduction and printing techniques, e.g., electrophotography, electrostatography and magnetography, a powder image is formed on a re-usable image registration medium, by means of toner powder containing thermoplastic resin. Generally the powder image is then transferred and fixed onto a receiving material, such as ordinary paper. The transfer of the powder image to the receiving material can be achieved by bringing the powder image registration medium into pressure contact with a fixing member, the surface of which consists of silicone rubber having a low affinity for the softened powder. The powder image transferred onto the fixing member as a result of the pressure exerted is then transferred by pressure to the receiving material. The powder is softened by heating before and/or during passage through the pressure zone so that it becomes so viscous that it forms a cohesive layer in response to the exerted pressure. This layer penetrates at least partially into the receiving material. After cooling, the image is permanently bonded to the image receiving material.

Heating of the powder image is effected by heating the fixing member, which functions as a temporary receiving support for the powder image and possibly the receiving material itself. Image transfer processes of this kind are described, inter alia, in U.S. Pat. Nos. 3,554,836 and 3,893,761 and UK Patent No. 1 279 687.

Image-forming processes are also known in which the powder image is transferred from the image registration medium directly, e.g., in response to an electric field, to the receiving material. It is then fixed by passing the receiving material through a pressure zone of two cooperating fixing members. The fixing member which presses against the image is typically provided with a layer of silicone rubber. At least one of the fixing members is heated to soften the powder image. Since both fixing members may come into contact with the thermoplastic resin, e.g., when the image receiving material is printed on both sides, it is usual for both fixing members to be provided with an outer covering of silicone rubber.

RTV or HTV silicone rubbers are normally used as surface covering for fixing members. They are obtained by cross-linking into an elastomeric composition polyorganosiloxane mixtures which bear reactive groups, under the influence of a suitable catalyst, at room temperature or at elevated temperature. The silicone rubber covering may also contain additives to improve its properties such as mechanical strength, thermal conductivity and antistatic behavior. Typical additives are fillers such as silica, titanium dioxide, calcium carbonate, iron oxide, teflon and carbon. The amount of additive in the covering may be 60% by weight or even more and is often between 40 and 50% by weight. Typical rubber compositions for forming a covering for fixing members which can be used as a temporary support for a powder image are described in UK patent No. 1 279 687 and Example 1 of European Patent Application No. 146 980. See also, British Patent Application No. 2 081 646 and European Application No. 0 062 048. In the former case an addition polymerization silicone rubber from low molecular (10 or less monomeric units) polyorganosiloxane is used as the bearing surface of the fusing member. Each Si-atom in the molecule includes a vinyl or allyl group. The latter patent application teaches an addition type silicone rubber bearing surface.

In addition to good mechanical strength required for long life, the rubber coverings present on fixing members should have a wide working range, i.e., there should be a wide temperature range within which the softened toner powder does not stick to the silicone rubber covering on leaving the pressure zone in which the powder image is fixed on the receiving material. This working range must also be situated at a temperature level at which sufficient fixing of the toner powder on the receiving material is obtained in the pressure zone. The working range of the silicone rubber coverings gradually reduces during operation of the fixing devices, in particular, the top limit of the working range decreases. Finally a point is reached in which there is no practical working range, and the fixing member has to be replaced. The development of everfaster copying machines and the continual search for components having a longer life mean that there is a continuous demand for improved covering materials for fixing members. Various improvements in silicone rubbers have been proposed. See, e.g., Japanese Patent Application Nos. 56-102880; 62-256863, 62-255g82 and 62-252457.

Although it has been possible to considerably lengthen the life of silicone rubber covering by continuously providing the covering with a thin layer of silicone oil at the fixing device during use, the disadvantage of this solution, however, is that silicone oil is transferred to the receiving material so that its writability deteriorates. In image-forming processes in which a powder image is transferred by pressure from an image registration element to the silicone rubber covering of a fixing member, the application of silicone oil cannot be carried out because the image registration element would be soiled by the oil and would become unsuitable for further use.

Accordingly, it is an object of the present invention to provide an improved fixing device. It is a further object of the present invention to provide a fixing member having an improved surface layer of silicone rubber.

DESCRIPTION OF THE INVENTION

Generally, the present invention consists mainly of a fixing member having a surface layer of silicone rubber obtained by the reaction of polyorganosiloxane bearing Si—H groups with polyorganosiloxane which bears Si—(CH=CH$_2$) groups and which contains on average between 40 and 1000 monomeric units per polymer chain, bears 1.5–4 terminal vinyl groups, bears at most one non-terminal vinyl group per 80 monomeric units and contains at most 2% Si atoms in the form of SiO3/2 or SiO4/2 units. The invention also comprises a fixing means having an outer cover comprising such silicone rubber.

Fixing members according to the invention are particularly suitable for use in image-forming processes in which a powder image is transferred to the fixing member by pressure and is then transferred to and fixed on a receiving material under pressure and heat. The fixing members according to the invention are distinguished from the prior art fixing members in that the top limit of the working range is at a significantly higher temperature and remains substantially constant for a long time (expressed as the number of copies). Thus a longer life is obtained for the fixing members. The silicone rubber used according to the invention is an addition-hardening RTV rubber derived from polyorganosiloxane bearing Si—(CH=CH$_2$) groups (hereinafter referred to as the "V-component"), and having the above-defined characteristics. If the V-component contains on average less than 40 monomeric units a rather brittle covering is obtained, which has insufficient resilient properties and insufficient mechanical strength. If it contains on average more than 1000 monomeric units then a rubber composition is obtained which generally is very sticky. V-components not satisfying the demands by themselves, can still be used by mixing them with another V-component, in such a manner that the mixture of V-components does satisfy upon the demands as defined before for the average. Preferably, a V-component is used which contains on average two terminal vinyl groups per polymer chain.

V-components suitable for use in the invention contain no SiO3/2 or SiO4/2 groups (respectively referred to as "T" and "Q" units hereinafter) and satisfy the general formula:

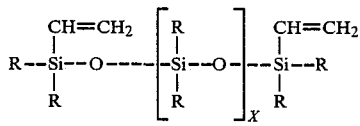

where R denotes the organic radical (or radicals) conventional in polyorganosiloxanes, such as an alkyl, phenyl, or trifluoroalkyl group, more particularly a methyl group, and X is an integer between 100 and 450, more particularly between 250 and 350.

Polyorganosiloxanes according to the above general formula are linear products which can be prepared easily and reproducibly.

The component bearing reactive Si—H groups (hereinafter referred to as the "H-component") is selected from the H-components known for the RTV rubber preparation. preferably, an H-component is used which contains between 6000 and 11000 m.mol/kg reactive hydrogen groups.

Linear H-components, more particularly those in accordance with the following general formula, are very attractive because they can be obtained easily and reproducibly.

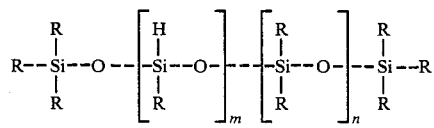

In this formula, R denotes the organic radical conventional in polyorganosiloxanes, as described hereinbefore, more particularly a methyl group, and the total m+n is between 5 and 40 while the ratio m:n is between 1.5–2.5:1.

The silicone rubber covering is obtained by mixing the V-component with the H-component in the presence of a suitable reaction catalyst, such as a platinum catalyst known for this purpose, and applying the homogeneous mixture in the required layer thickness to a suitable support or substrate. The ratio between the V and H components is so selected that there is an excess of reactive Si—H groups with respect to Si—(CH=CH$_2$)-groups. Upon using the fixing member in image forming processes in which the fixing member itself acts as a temporary receiving support for a powder image, the silicone rubber outer covering is preferably formed from a mixture of V and H components in which the Si—H groups are present in an excess of 40 to 60%. In other circumstances the excess of Si—H groups may even amount to 400%.

In the fixing members according to the invention, the silicone rubber covering may consist completely of the silicone rubber described hereinbefore, but it can also contain the additives known for such coverings, e.g., fillers, silicone resins and antistatic substances, the total of such additives however being at most 20% by weight, and, preferably, not more than 10% by weight. Also, the covering liquid from which the layer is formed may contain a reaction inhibitor in order to bring to the required level the time during which the liquid can be processed.

According to the invention, the thickness of the silicone rubber covering on the fixing members is preferably between 10 and 250 micrometers. When the fixing member is used in image-forming processes, as described above, in which the fixing member operates as a temporary support for the powder image, the silicone rubber covering on the fixing members is preferably between a few hundred micrometers to a few millimeters. The choice of the rubber composition for the substrate is not critical. Of course a rubber composition should be selected in which the top layer adheres rigidly and which is also strong enough to withstand the pressure applied. Suitable substrates are, for example, silicone rubbers as described in the patents referred to hereinbefore.

The silicone rubbers used according to the invention as outer covering for fixing members acting as a temporary receiving support for a powder image may have a hardness of between 20 and 30° Shore A. They therefore are much softer than the silicone rubbers previously used in practice for this purpose which generally have a hardness of between 40 and 55° Shore A. Despite the lower hardness, the fixing members according to the invention—provided that the surface layer is not too thick (<500 micrometers)—have a good mechanical strength, comparable to that of the fixing members used heretofore.

PRESENTLY PREFERRED EMBODIMENTS

The invention will now be explained in detail with reference to the following examples.

EXAMPLE 1

A fabric belt woven from polyester yarn was provided with an approximately 500 micrometer thick layer of silicone rubber of type RTV 200/201 made by Messrs. Possehl, West Germany. An approximately 70 micrometer thick silicone rubber layer was applied over this rubber layer by coating with a liquid of the following composition:

100 g of the V-component described hereinafter, 1.9 g of the H-component described hereinafter,
5 ppm of a conventional platinum catalyst, and
40 ppm of 1-ethynyl-1-cyclohexanol (inhibitor).

The resulting layer was hardened by holding the belt at a temperature of about 120° C. for about 20 hours. The resulting fixing member was used in a copying machine of the Oce 1950 type, in which a powder image was formed on a photoconductive image registration element, the powder image was transferred to the rubber surface of the heated fixing member by pressure, and the softened image was finally transferred to a sheet of paper pressed against the fixing member in a pressure zone. The working range of the fixing member was 103°–142° C. After 300,000 copies (A4 size) the working range was still unchanged. Using a fixing member with a top layer as described in Example 8 of UK patent 1 279 687, the working range was 101°–128° C., while after 100,000 copies that working range had dropped to 101°–112° C.

Preparation of H-component

A mixture of:
810 g of tetramethyl tetrahydro-cyclotetrasiloxane,
499.5 g of octamethyl cyclotetrasiloxane, and
64.5 g of hexamethyldisiloxane.
was cooled to a temperature of about 0° C. with continuous agitation. While the mixture temperature was kept below 20° C., 64 g of concentrated sulphuric acid were added to the mixture dropwise.

After all the sulphuric acid had been added, the reaction mixture was agitated for another hour and a half at a temperature between 10° C. and 20° C. and then poured into a mixture of 2000 ml of water and 2000 ml of methylene chloride. The methylene chloride phase was separated and washed with water until the washing water was neutral.

After being dried over magnesium sulphate for about 15 hours, the methylene chloride phase was filtered and subjected to vacuum distillation, the undesired fractions distilling off at 70° to 100° C. under 14 mm mercury. The residue was an H-component having the average formula:

$[(CH_3)_3SiO1/2]—[(CH_3)_2SiO2/2]_{9.5}—[H(CH_3)SiO2/2]_{19}—[(CH_3)_3SiO1/2]$

The amount of reactive Si—H groups in the resulting product was 9500 m.mol/kg.

Preparation of V-component

A mixture of:
532 g of octamethyl cyclotetrasiloxane and
5.1 g of divinyl tetramethyl-disiloxane.
was heated to ±85° C. with agitation, and then 0.1 g of tetramethyl ammonium hydroxide was added.

The reaction mixture was agitated at about 85° C. until there was no further increase in viscosity. This situation was obtained after about 1½ hours. The reaction mixture was then held at 150° C. for one hour with agitation and then heated to 170° C. It was then distilled in vacuo until all the volatile constituents had been eliminated from the reaction mixture. The residue was then filtered.

The resulting V-component had the average formula:

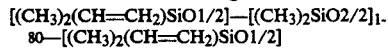

The quantity of Si—(CH=CH$_2$) groups in the product was 120 m.mol/kg.

EXAMPLE 2

A fixing member was made in the manner described in Example 1, the silicone rubber outer covering being formed by means of a liquid of the following composition:
100 g of V-component in accordance with Example 1,
1.6 g of H-component of the formula $[SiO4/2]_{10}—[SiO1/2(CH_3)_2H]_{24}$,
5 ppm of platinum catalyst,
40 ppm of 1-ethynyl-1-cyclohexanol, and
5 g of carbon.

The outer covering had a thickness of 120 micrometers. The working range of the fixing member in an Oce 1950 copying machine was 102° to 135° C. After 250,000 copies (A4 size) the working range was 103°–134° C.

The H-component used was prepared by adding 36.3 ml concentrated hydrochloric acid dropwise at a temperature of between 5° and 30° C. to a solution of 51.3 g of tetraethoxy-silane and 50 g of dimethyl chlorohydrosilane in 250 ml of methylene chloride. The reaction mixture was then agitated for 3 hours at the same temperature and then poured in water. The remaining processing was as described in Example 1. The H-component contained 10400 m.mol/kg reactive Si—H groups.

Practically the same result as just described was obtained with a silicone rubber outer covering formed by means of the following composition:
79 g of V-component of the formula

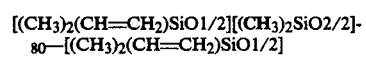

21 g of V-component of the formula

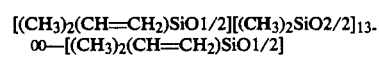

6 g of H-component in accordance with Example 2
4 ppm of platinum catalyst, and
40 ppm of 1-ethynyl-1-cyclohexanol

EXAMPLE 3

A fixing member was made as described in Example 1, the silicone rubber outer covering having a layer thickness of 100 micrometers and being formed by means of a liquid of the following composition:
100 g of V-component of the formula

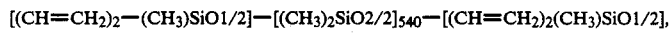

1.35 g of H-component in accordance with Example 1,
5 ppm of platinum catalyst, and
40 ppm of 1-ethynyl-1-cyclohexanol.

Used in an Oce 1950 copying machine the working range of the fixing member was 103°–141° C. and, after 300,000 copies, 103°–138° C. The V-component was prepared in the manner as described in Example 1, starting, however, from 532 g of octamethyl cyclotetrasiloxane, 2.1 g of tetravinyl dimethyl disiloxane and 0.1 of tetramethyl ammonium hydroxide. The V-component contained 85 m.mdl/kg reactive Si(CH=CH$_2$) groups.

If 1.61 g of H-component were used in the above composition, the resulting fixing member had an initial working range of 104° to 139° C. and 104° to 138° C. after 300,000 copies.

If 100 g of V-component of the average formula [(CH=CH$_2$)(CH$_3$)$_2$SiO1/2]$_2$—[(CH$_3$)$_2$SiO2/2]$_{200}$—[(CH$_3$)SiO3-2]$_{0.5}$—[SiO4/2]$_3$ were used in the above composition, the working range of the fixing member was 103° to 136° C. The latter V-component was prepared starting with (CH=CH$_2$)(CH$_3$)$_2$SiCl, (CH$_3$)$_2$SiCl$_2$, (CH$_3$)$_3$SiCl and (C$_2$H$_5$O)$_4$Si, by mixing these substances in the molar ratio indicated, hydrolyzing with water, extracting the reaction products from the hydrolysis liquid and then polymerizing by addition of a small quantity of tetramethyl ammonium hydroxide.

EXAMPLE 4

Two fixing members were made in accordance with Example 1, the following being used respectively in the composition for forming the silicone rubber outer covering:

1.63 g of H-component of the formula

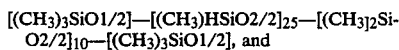
[(CH$_3$)$_3$SiO1/2]—[(CH$_3$)HSiO2/2]$_{25}$—[(CH$_3$)$_2$SiO2/2]$_{10}$—[(CH$_3$)$_3$SiO1/2], and 2.52 g of H-component of the formula

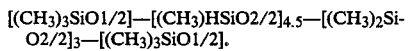
[(CH$_3$)$_3$SiO1/2]—[(CH$_3$)HSiO2/2]$_{4.5}$—[(CH$_3$)$_2$SiO2/2]$_3$—[(CH$_3$)$_3$SiO1/2].

In an Oce 1950 copying machine both fixing members had a substantially identical working range which remained substantially constant for 300,000 copies at 102° to 141° C. Both H-components were prepared in the manner described in Example 1, the first H-component being based on 871.5 g of tetramethyl tetrahydrocyclotetrasiloxane, 444.6 g of octamethyl cyclotetrasiloxane, 81.1 g of hexamethyl disiloxane and 65.1 g of concentrated sulphuric acid. This H-component contained 10400 m.mol/kg reactive Si—H groups.

For the preparation of the second H-component the same starting products were used, but now in the following quantities respectively: 510.3 g, 371.1 g, 486.6 g and 63.6 This H-component contained 6900 m.mol/kg reactive Si—H groups.

EXAMPLE 5

In a copying machine of the Oce 1950 type, the fixing member receiving the powder image from the photoconductive image registration element, was made as described in Example 1.

The second fixing member, pressing against the rear-side of the image receiving material in the pressure zone where the powder image is transferred to and fixed on to the image receiving material, was constructed as a belt, of which the support and the first rubber layer were composed as described in Example 1. The silicone rubber outer covering of this belt had a thickness of 150 micrometer and was made by means of the following composition:

67 g of V-component of the average formula

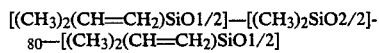
[(CH$_3$)$_2$(CH=CH$_2$)SiO1/2]—[(CH$_3$)$_2$SiO2/2]$_{80}$—[(CH$_3$)$_2$(CH=CH$_2$)SiO1/2]

23 g of V-component of the average formula

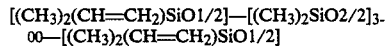
[(CH$_3$)$_2$(CH=CH$_2$)SiO1/2]—[(CH$_3$)$_2$SiO2/2]$_{300}$—[(CH$_3$)$_2$(CH=CH$_2$)SiO1/2]

4.4 g of H-component of the average formula

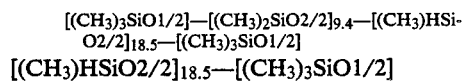
[(CH$_3$)$_3$SiO1/2]—[(CH$_3$)$_2$SiO2/2]$_{9.4}$—[(CH$_3$)HSiO2/2]$_{18.5}$—[(CH$_3$)$_3$SiO1/2]

[(CH$_3$)HSiO2/2]$_{18.5}$—[(CH$_3$)$_3$SiO1/2]

(Reactive Si—H groups: 9240 m.mol/kg)
5 ppm of platinum catalyst, and
40 ppm of 1-ethynyl-1-cyclohexanol In the copying machine 200,000 copies were made, about half of which consisted of double sided copies.

At the end of the test both fixing members still had a wide working range.

While presently preferred embodiments of the invention have been described in particularity, the invention may be otherwise embodied within the scope of the appended claims.

What is claimed is:

1. A device for fixing or transferring and fixing a powder containing a thermoplastic resin onto a receiving support under the influence of pressure and heat comprising a fixing member with an outer covering having an average thickness of up to 500 μm consisting essentially of silicone rubber obtained by reaction of a polyorganosiloxane having Si—H groups with a polyorganosiloxane with Si—(CH=CH$_2$) groups and which contains on average between 40 and 1000 monomeric units per polymer chain, and has 1.5–4 terminal vinyl groups, and at most one non-terminal vinyl group per 80 monomeric units and contains at most 2% Si atoms in the form of SiO3/2 or SiO4/2 units.

2. A device according to claim 1, wherein the silicone rubber in said outer covering is derived from polyorganosiloxane in which all of said Si—(CH=CH$_2$) groups are terminal.

3. A device according to claim 2, wherein said silicone rubber is derived from polyorganosiloxane having vinyl groups in accordance with the formula:

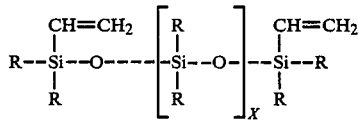

where R denotes a conventional organic radical, such as a methyl group, and X is an integer between 100 and 450.

4. A device as set forth in claim 3 wherein X is an integer between 250 and 350.

5. A device according to claims 1, 2, 3 or 4 wherein said silicone rubber is derived from polyorganosiloxane which bears Si—H groups and which contains between 6000 and 11000 m.mol/kg reactive Si—H groups.

6. A device according to claim 4, wherein said silicone rubber is derived from polyorganosiloxane which bears Si—H groups and which contains between 6000 and 11000 m.mol/kg reactive Si—H groups.

7. A device according to claim 1, wherein said silicone rubber is derived from polyorganosiloxane which bears Si—H groups, in accordance with the general formula:

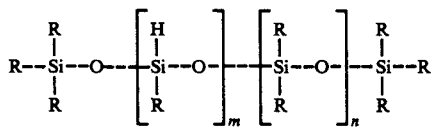

where R denotes a conventional organic radical; the total m+n is between 5 and 40; and the ratio m:n is between 1.5-2.5:1.

8. A device according to claims 1, 2, 3, 4 or 6, wherein said silicone rubber is obtained from a mixture of the said polyorganosiloxanes in which Si—H groups are present in excess with respect to the Si(CH=CH$_2$) groups.

9. A device according to claims 1, 2, 3, 4 or 6, wherein said outer covering contains at least 80% by weight of said silicone rubber.

10. A device for forming fixed images on a receiving material comprising a fixing member provided with an outer covering of silicone rubber as set forth in claims 1, 2, 3, 4 or 6 including means for providing the outer covering with a powder image by means of a powder which contains thermoplastic resin, means for bringing a receiving material into pressure contact with the fixing member and heating means for softening the powder image.

11. A device according to claim 10, wherein the fixing member bears a silicone rubber outer covering obtained from a mixture of polyorganosiloxanes in which Si—H groups are present in a 40 to 60% excess with respect to the Si(CH=CH$_2$) groups.

* * * * *